US006589587B1

(12) United States Patent
Benjamins et al.

(10) Patent No.: US 6,589,587 B1
(45) Date of Patent: Jul. 8, 2003

(54) POURABLE WATER AND OIL CONTAINING EMULSIONS COMPRISING GAS BUBBLES

(75) Inventors: Jan Benjamins, Vlaardingen (NL); Jochen Effey, Vlaardingen (NL); Eckhard Floeter, Vlaardingen (NL); Rowdy van Gelder, Vlaardingen (NL)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/868,998

(22) PCT Filed: Dec. 7, 1999

(86) PCT No.: PCT/EP99/09573

§ 371 (c)(1),
(2), (4) Date: Jul. 30, 2001

(87) PCT Pub. No.: WO00/38546

PCT Pub. Date: Jul. 6, 2000

(30) Foreign Application Priority Data

Dec. 23, 1998 (EP) .............................................. 98204442

(51) Int. Cl.[7] .................................................. A23D 7/00
(52) U.S. Cl. ...................... 426/603; 426/564; 426/606; 426/312; 426/319
(58) Field of Search ................................. 426/564, 312, 426/319, 602, 570, 571, 572, 603, 606

(56) References Cited

U.S. PATENT DOCUMENTS

| 3,682,656 | A | * | 8/1972 | Wilton | 426/603 |
|---|---|---|---|---|---|
| 4,308,294 | A | * | 12/1981 | Rispoli et al. | 426/564 |
| 4,818,554 | A | * | 4/1989 | Giddey et al. | 426/564 |
| 4,957,656 | A | * | 9/1990 | Cerny et al. | 424/9.52 |
| 4,960,606 | A | * | 10/1990 | Crosby | 426/602 |
| 5,086,620 | A | * | 2/1992 | Spears | 62/51.1 |
| 5,228,446 | A | * | 7/1993 | Unger et al. | 424/9.51 |
| 5,310,540 | A | * | 5/1994 | Giddey et al. | 424/9.52 |
| 5,393,549 | A | * | 2/1995 | Badertscher et al. | 426/564 |
| 5,472,726 | A | * | 12/1995 | Bee et al. | 426/565 |
| 5,552,133 | A | * | 9/1996 | Lambert et al. | 424/9.52 |
| 5,730,955 | A | * | 3/1998 | Lohrmann | 424/9.52 |

FOREIGN PATENT DOCUMENTS

| GB | 1333938 | * | 10/1978 |
| GB | 2078483 | * | 1/1982 |
| GB | WO 92/21255 | * | 12/1992 |
| GB | EP 0521543 | * | 1/1993 |
| NL | WO 94/12063 | * | 6/1994 |
| NL | EP 0777969 | * | 11/1997 |
| US | EP 0359246 | * | 9/1988 |
| WO | 94/12063 | | 9/1994 |

OTHER PUBLICATIONS

PCT Search Report in PCT/EP 99/09573.

* cited by examiner

*Primary Examiner*—Carolyn Paden
(74) *Attorney, Agent, or Firm*—Gerard J. McGowan, Jr.

(57) ABSTRACT

The invention relates to pourable water and oil containing emulsions comprising an aqueous phase and gas bubbles, whereby said gas bubbles are substantially dispersed in the aqueous phase. Emulsions according to the invention show increased stability.

7 Claims, No Drawings

POURABLE WATER AND OIL CONTAINING EMULSIONS COMPRISING GAS BUBBLES

FIELD OF THE INVENTION

The invention relates to a pourable water and oil containing emulsion comprising a continuous fatty phase and a dispersed aqueous phase, and gas bubbles. The invention also relates to a process to prepare such products.

BACKGROUND OF THE INVENTION

Pourable emulsions of a fat and a water phase are known. Examples are emulsions of water in oil such as liquid margarines. Further examples are oil in water emulsions such as dressings or sauces.

The dispersed aqueous phase of water in oil emulsions is present in the form of water droplets.

Pourable products are considered easily dosed and are therefore desired products.

The physical storage stability of pourable water and oil emulsion type products is considered quite important.

Liquid or pourable emulsions may be relatively unstable in that water droplets which are part of the dispersed aqueous phase can sediment to the bottom of the emulsion. In the current application where reference is made to a "stable" system, avoiding the phenomenon of sedimentation of one phase is referred to. Sedimentation is observed with products comprising a fat phase and a dispersed aqueous phase, whereby water droplets sink to the bottom of the system, where a water droplet layer is formed.

Simultaneously an oil layer may be formed on top of the product, although most oil will often still be present in an emulsion layer. Under extreme circumstances sedimentation may lead to the formation of a separated aqueous phase and a separated oil phase. Formation of this oil layer is referred to as oil exudation.

Sedimentation of the aqueous phase could also have adverse effects on the product performance in use since functional ingredients might be part of the water phase sedimenting.

Phase separation of a water in oil emulsion is not desired by the consumer who tends to desire that the product as bought stays intact and unchanged upon storage.

It is known that the separation of a liquid margarine into two layers can be overcome at least partly by selection of a specific hardstock fat composition.

However hard stocks that improve stability of liquid margarines often lead to products with increased viscosity and reduced pourability. This increased viscosity can be undesired for pourable products.

Moreover the use of fats comprising (poly) unsaturated triglycerides is often preferred over the use of hardened hardstock fats with saturated carbon-carbon bonds.

Therefore there is a desire for storage stable products which comprise no or reduced amounts of hardstock compared to the products which are currently on the market which comprise generally about 3 to 5 wt % hardstock.

Other measures to increase physical stability of pourable water in oil emulsions have been suggested in the art.

GB-A-1,333,938 discloses that the separation of a pourable margarine into two phases can be at least partly overcome by incorporating in the emulsion an emulsion-stabilising amount of gas bubbles. The gas content in the pourable margarine according to this document is from 0.5 to 20% by volume. Stabilising gas may be introduced into water in oil emulsions which comprise all ingredients, either before or after a chilling stage. In this process the majority of gas bubbles is believed to end up in the fat phase.

Furthermore WO-A-94/12063 discloses the use of gas cells in food products. Water continuous food products such as low fat spreads and dressings are disclosed, said products comprising gas cells and having a thermodynamic stability in excess of 2 weeks. More than 90% by number of the gas cells in said products have an average D3,2 particle size of less than 20 $\mu$m. The gas cells are prepared by application of high shear to the product or a pre-mix.

Although some of the above disclosed products show some improvement in stability against phase separation the above described methods and products often do not give satisfactory results in terms of storage stability.

Several problems are encountered with prior art products. The presence of gas cells essentially in the continuous fat phase leads to products which showed an undesired increase in viscosity, compared to products wherein no or almost no air was introduced in the fat phase.

The use of hardstock fats which are rich in saturated triglyceride fats, is undesired as the use of (poly) unsaturated fats is preferred in view of health benefits.

DEFINITION OF THE INVENTION

It has now surprisingly been found that the above indicated problems can be overcome by a fat continuous water and oil emulsion comprising an aqueous phase whereby gas bubbles are substantially dispersed in the aqueous phase.

Accordingly the present invention provides a pourable water and oil containing emulsion comprising a continuous fatty phase and a dispersed aqueous phase, and gas bubbles, characterised in that said gas bubbles are substantially dispersed in the aqueous phase.

In another aspect, the invention relates to a process for the preparation of amn emulsion according to the invention.

DETAILED DESCRIPTION

The pourable emulsions according to the invention are emulsions showing a Bostwick value of more than 12, preferably more than 15 at 15° C. The method to determine Bostwick value is described in the examples.

Where ranges are mentioned throughout the description and claims, the expression from a to b is meant to indicate from and including a, up to and including b, unless indicated otherwise.

The term gas bubbles refers to individual gas units which are all part of a dispersed gas phase.

In this application the terms "gas cells" and "gas bubbles" are used interchangeably.

In this application the terms "oil" and "fat" are used interchangeably.

Emulsions according to the invention comprise a dispersed aqueous phase and a continuous fatty phase. Pourable products according to the invention are for example dressings, sauces, liquid margarines.

A liquid margarine is a pourable water in oil emulsion comprising generally from 1 to 40, preferably 5 to 30 wt % water on total product weight.

The current invention is especially suitable for pourable water in oil emulsions comprising from 1 to 40 wt % aqueous phase on total product.

In a preferred embodiment beverages are not included in the term "emulsion".

It has been found that the incorporation of gas bubbles, substantially in the aqueous phase of water in oil emulsions leads to products which are stable against sedimentation for at least 4 weeks, and often even for at least 2 months at storage temperatures of from 4° C. to ambient temperature.

Emulsions according to the invention are storage stable. This implies that said products preferably do not show exudation of the fatty phase or the aqueous phase after storage at temperatures from 4° C. to ambient temperature for a period of 4 weeks, preferably 2 months, most preferred 3 months. For water in oil emulsions this stability can be measured by a test wherein the emulsion is stored at about 5° C. for a time of 6 weeks. After a certain storage period the emulsion is checked on the formation of an oil layer on top of it. Preferred products show after 1 months of storage an oil layer of less than 20 vol %, more preferably less than 10 vol %, more preferred less than 3 vol %, most preferred less than 1 vol % on total emulsion. The method to determine the oil layer is described in the examples.

This improved stablity is surprising in that the skilled person, on the basis of common knowledge, would not have expected that the mere addition of gas to the aqueous phase of a water in oil emulsion would give the desired improvement in stability.

Moreover it was found that emulsions according to the invention, comprising gas bubbles substantially in the aqueous phase, show improved spattering behaviour.

To obtain the desired effect of density matching of the aqueous phase and the oil phase, gas bubbles comprised in products according to the invention, should be substantially dispersed in the aqueous phase of said emulsions. This means that preferably at least 50 vol %, more preferably at least 70 vol %, even more preferably at least 80 vol %, most preferred 90–100 vol % of all gas bubbles is dispersed in the aqueous phase, whereas the remaining part of the gas bubbles may be in the fatty phase.

Random distribution of gas bubbles in for example margarine is known from GB-A-1,333,938. It has been found that such products often show instability upon storage.

It has been found that the presence of gas bubbles in the aqueous phase influences the average density of the water droplets. Incorporation of gas bubbles in said aqueous phase was found to enable adjustment of the density of the dispersed aqueous phase droplets. Said adjustment determines physical characteristics of a pourable water in oil emulsion. If gas bubbles are present in dispersed water droplets of a water in oil emulsion, they can decrease the density of said water droplets.

The volume of gas in a water droplet is believed to determine it's density. If the gas volume per water droplet is such that the density of the water droplet is below the density of oil, the water droplets will even rise to the system's surface. This is also called creaming of the dispersed aqueous phase. It is believed to be within the capabilities of the skilled person to select the desired volume of gas per water droplet, while guided by the teaching as given herein.

The gas bubbles can be of any size. In water in oil emulsions it will however be appreciated that the size of the gas bubbles is limited by the size of the water droplets which constitute the dispersed aqueous phase. In a preferred embodiment, at least 80 vol % of the total volume of gas in emulsions according to the invention, is present as gas bubbles having a mean diameter size between 0.5 and 25 μm. The preferred mean diameter size of gas bubbles is below 10 μm, more preferred from 1 to 5 μm.

Water droplets in water in oil emulsions according to a preferred embodiment of the invention can comprise one or more gas bubbles per droplet, depending on the relative size of the water droplet, compared to the size of the gas bubbles. If small gas bubbles are present, for example with a diameter of from 0.1 to 0.4 μm, more than one gas bubble can be present in a water droplet.

The total amount of gas present in the emulsion according to the invention was found to depend on the goal that is envisaged. The amount of gas is preferably such that the density of the aqueous phase about equals the density of the fatty phase. An amount of gas of for example from 1 to 20 vol % on aqueous phase was found to lead to satisfying results.

It is believed that it is within the capabilities of the skilled person to select the appropriate amount of gas. The vol % of gas on aqueous phase can be determined by CSLM or by measuring the density of an isolated aqueous phase, and comparing the measured density to the density of water free of incorporated gas bubbles.

The preferred amount of gas on aqueous phase is from 5 to 20 wt %.

According to a very preferred embodiment, the invention relates to a pourable emulsion, comprising 20 to 98 wt % of a fatty phase, and 80 to 2 wt % of an aqueous phase, said aqueous phase comprising 5 to 20 vol % gas such that the average density of the aqueous phase differs at most 5% from the density of the oil phase.

The gas bubbles in the claimed products can comprise any gas, for example selected from the group consisting of inert gas such as nitrogen, helium, argon and the like; oxygen, and air.

Highly preferred gases are nitrogen, argon, oxygen, air and/or combinations thereof.

The fatty phase can comprise any fat, but a fat phase rich in triglycerides comprising (poly) unsaturated fatty acid residues is highly preferred.

Therefore the fat is preferably selected from the group comprising sunflower oil, soybean oil, rapeseed oil, cottonseed oil, olive oil, corn oil, groundnut oil, or low melting butterfat fractions and/or combinations thereof.

These fats may be partially hydrogenated.

The fatty phase can also comprise sucrose polyesters (SPE's).

Optionally the product comprises in addition to these fats a hard fat component selected from the group comprising: hardened rapeseed oil, hardened soybean oil, hardened rapeseed oil, hardened cottonseed oil, hardened corn oil, hardened groundnut oil, palmoil, hardened palmoil, palmoil fractions, hardened palmoil fractions, butterfat or butterfat fractions. These fats are optionally partly or fully hydrogenated to obtain the desired structuring properties.

This hard fat may partly serve to impart stability to the products, in addition to the stability obtained by the aqueous phase comprising gas bubbles. In view of the potential disadvantages of the presence of hard fat such as increased viscosity and reduced pourability, it is preferred that the amount of hard fat is below 2 wt %, more preferred below 1 wt %. Most preferred hard fat is essentially absent in products according to the invention.

To further increase the product stability and to reduce water droplet coalescence, products according to the invention preferably comprise an emulsifier. Suitable emulsifiers are for example Admul Wol, polyglycerol esters, sucrose esters, partial glycerides, lecithins, others and mixtures thereof.

Preferred amounts of emulsifier are from 0.1 to 3 wt %, more preferred 0.5 to 1.2 wt % on total product.

In addition to the above mentioned ingredients, emulsions according to the invention may optionally contain further ingredients suitable for use in these products. Examples of these materials are sugar or other sweetener materials, EDTA, spices, salt, bulking agents, egg yolk, stabilising agents, flavouring materials, colouring materials, acids, preserving agents, vegetable particles etc.

Other suitable ingredients that can be included in emulsions according to the invention are spattering reducing agents such as lecithin and salt or combinations thereof.

Generally the balance of compositions according to the invention will be water.

Products according to the invention can be prepared by general methods as known to the person skilled in the art. For example a premix comprising all ingredients is prepared, followed by blending and mixing in order to establish a suitable emulsion. If desired the crystallisation of solid fat if present can either be performed a priory or as a processing step in which the premix is cooled by one or more scraped surface heat exchangers. In such a step also the process of emulsification could take place. Emulsification could on the other hand as well be envisaged by other kinds of techniques as, e.g. membrane emulsification and the like.

According to a preferred embodiment, an aqueous phase comprising gas bubbles is prepared in a separate step and thereafter mixed with other ingredients such as the fat phase.

Gas bubbles may be introduced into the aqueous phase in situ or in a separate step in (part of) the aqueous phase. It is preferred to prepare the gas bubbles in bulk in a separate step in an aqueous medium and to add the resulting gas bubbles-containing aqueous medium to the remaining part of the aqueous phase of the final product.

If the gas bubbles are introduced in the in situ method, the aqueous medium may comprise (part of) the ingredients of the final product.

The gas may be introduced in the aqueous medium in a variety of methods. Suitable methods are for example disclosed in WO-A-94/12063.

According to one embodiment the gas is introduced in the aqueous medium by using a high shear mixer, e.g. a Kenwood Chef mixer, a colloid mill, a cake mixer, a cavity transfer mixer or a Silverson.

It is preferred that a suitable thickener is present in the aqueous medium while forming the gas bubbles. Suitable thickeners are for example sugars, (hydroxyalkyl) celluloses, hydrolysed starches or combinations thereof.

Preferably the amount of thickener is such that the viscosity of the medium wherein gas bubbles are introduced by shear is from 0.1 Pa.s to 20 Pa.s at 5° C. and a shear rate of 100 s$^{-1}$.

The amount of thickener is preferably from 0.1 to 10 wt % on the aqueous phase wherein gas cells are prepared.

The temperature at which the gas cells are prepared is preferably between 5 and 25° C., whereby temperatures from 15 to 20° C. are preferred.

It has been found that by increasing the viscosity and/or lowering the temperature of the aqueous medium wherein gas cells re prepared, the size reducing effect of the mixer on the gas cells is increased.

The resulting aqueous medium comprising gas bubbles is also referred to as "foam". The foam is mixed with the remaining aqueous phase ingredients by blending. The resulting water-foam solution is subsequently stirred into the fatty phase. Conventional processing for water in oil emulsions can be applied at this stage.

The amount of foam to be added is among others dependent on its density and can be determined from the following calculation.

$$\frac{1}{\rho_{OIL}} = \frac{(1-x)}{\rho_{H2O}} + \frac{x}{\rho_{FOAM}}$$

where ρ indicates the density of the respective phase and x its weight fraction.

Preferably the addition of foam is such that the average density of the resulting aqueous phase differs at most 5% from the density of the oil phase.

The obtained aqueous phase which comprises gas bubbles can be used in the further preparation of the final product, for example to prepare a pumpable oleaginous composition (i.e. a liquid margarine).

In a preferred process the aqueous phase comprising gas bubbles is mixed into a fatty phase at elevated temperature, whereby high shear is avoided.

If a small amount of hardened fat such as hardened rapeseed oil is present in the final product, a preferred process comprises the steps of melting triglyceride oil in shear mixer such as an A unit, cooling to below the alpha crystallisation temperature and subsequent, or prior to cooling, mixing the triglyceride oil with the above indicated aqueous phase comprising gas bubbles.

The resulting product is preferably stored at a temperature from 0 to 15° C.

It has been found that the above process sometimes results in a water in oil emulsion comprising water droplets of a density which differs over a wide range as some water droplets may comprise a high gas volume and others only a low gas volume.

Therefore in a preferred embodiment, the process includes a step wherein the water droplets with adequate, approximately oil matching density, are separated from other water droplets. Therefore in an optional step, the preparation is centrifuged for one hour at 500–2000 rpm, preferably about 1000 rpm at a temperature from 5 to 30° C., more preferred at ambient temperature. Due to the exerted forces the droplets with densities clearly higher than the oil density are then sedimenting while the density matching water-foam droplets remain evenly distributed throughout the centrifuge tube. The supernatant from this centrifugation step can be considered the final product while the sediment layer is discarded and optionally recycled.

It will be appreciated that this optional separation step is not required for products wherein the level of foam introduced was such that the density of the resulting oil phase and aqueous phase matched accurately and the foam is homogeneously distributed over the dispersed aqueous phase after all processing steps.

At industrial scale the above-indicated preferred separation step can be realized in various ways. In this purification/selection step of bubbles containing adequate amounts of foam, predominantly density driven separation equipment as industrial semi continuous centrifuges or liquid/liquid cyclones is preferably used. In such an equipment the non-density matching droplets can be separated from the continuous emulsion flow that can contain the water droplets with a density close to the continuous phase.

Alternatively simple sedimentation baths can be used where at a low flow rate the desired density matching droplets can be taken from the middle of the emulsion layer while the lower and upper layers, due to mismatch of density, are discarded and optionally recycled. It is believed to be within the capabilities of the skilled person to carry out this kind of preparative step as a continuous unit operation, on the basis of the guidance presented in this application.

The invention is now illustrated by the following non-limiting examples.

EXAMPLES

A. Analysis Methods

The average mean diameter of gas bubbles is determined by measuring D(3,2) values by light scattering using a Malvern apparatus and following the procedure as described in the manual thereof.

Bostwick Value Determination

Pourability is measured according to the standard Bostwick protocol. The Bostwick equipment consists of a 125 ml revervoir with a outlet near the bottom of a horizontally placed rectangular tub and closed with a vertical barrier.

The tub's bottom is provided with a 24 cm measuring scale, extending from the outlet of the reservoir. When equipment and sample both have a temperature of 15 deg. C., the reservoir is filled with 125 ml of the sample after it has been shaken by hand ten times up and down. When the closure of the reservoir is removed the sample flows from the reservoir and spreads over the tub bottom.

The path length of the flow is measured after 15 seconds. The value, expressed as cm per 15 seconds is the Bostwick rating, which is used as yard stick for pourability.

For all examples the Bostwick value was 24 cm/15 sec.

Product Preparation

1. Preparation of the Aqueous Medium Comprising Gas Bubbles (Foam).

Composition:

108 gr malto dextrin 40 DE 67 gr dextrose 2.5 gr sucrose ester(Ryoto S1670)

72.5 gr water

A solution was made by first suspending the surfactant (=sucrose ester) in cold water and then heating to ~70° C.

A plastic beaker in a microwave oven was used for heating. A weak gel resulted. Maltodextrin/dextrose were stirred in. The resulting mixture was cooled to room temperature and whipped in a small Hobart using the cage whisk for 60 minutes. This length of time is necessary as the comminution of the gas cells continues to take place. We have incorporated about 0.6 phase volume of air and had a wide gas cell size distribution. This suspension was aged for about a day at 5° C. The gas cells formed as the smallest cells tended to partly dissolve. The gas cells were harvested by diluting the suspension with water as necessary, or preferably with more sucrose ester/maltodextrin solution.

2. Preparation of the Aqueous Phase

A solution of 1 wt.-% sucrose ester in 99 wt.-% water was heated to 70° C. and stirred until the water phase is homogenous. 10 wt.-% of the foam as described above was added to a solution of 1 wt % sucrose ester in water, and stirred. The optimal incorporation level of foam per droplet to approximately match the density of the continuous phase can easily be calculated from the following equation, $$\frac{1}{\rho_{OIL}} = \frac{(1-x)}{\rho_{H2O}} + \frac{x}{\rho_{FOAM}}$$

where ρ indicates the density of the respective phase and x its weight fraction. This corresponds to the 10% (w/w) foam added to the water/sucrose ester solution, since the density of the foam was proximately 0.5 g/ml.

Example 1

The water-foam solution resulting from the previous step was added at a level of 20% to a fat phase. This fat phase consisted of 98% sunflower oil, 1% fully hardened high erucic rapeseed oil (RPh70), and 1% Admul Wol. All percentage given in weight per cent. The RPh70 was added to the preparation in form of a pre-crystallised solution of 10% RPh70and 90% sunflower oil. The pre-crystallised solution was prepared via standard processing over a scraped surface heat exchanger (A-Unit). To disperse the water-foam solution in the fat phase the preparation was stirred for 5 minutes at 1200 rpm with a 4 blade turbine mixer. The admul WOL and RPh70were added to the preparation in order to prevent the coalesence of the water droplets.

Due to the inhomogeneous distribution of the foam over the water droplets a subsequent purification step was desired.

This step separated droplets with adequate, thus approximately oil matching density, from other water droplets. To this end the preparation was centrifuged for one hour at 1000 rpm at ambient temperature. Due to the exerted forces the droplets with densities clearly higher than the oil density are sedimenting while the density matching water-foam droplets remain evenly distributed throughout the centrifuge tube. The supernatant from this centrifugation step was considered the final product while the sediment layer was discarded. The level of water in the final product was 9% (w/w).

The 9% water in 91% oil emulsion product obtained according to the above preparation scheme was compared with a reference product. The reference product (comparative example c1) was prepared in the following way. To a fatty phase identical to the one described above a pure water phase was added at a level of 9% (w/w). The mixing/dispersing process was performed by mixing with the above mentioned turbine mixer at 1200 rpm for 5 minutes.

Stability Test I

Both products were filled into glass cylinders and stored in a refrigerator for 6 weeks at 5 degree Celsius. Results are given in the table 1.

TABLE 1

| | results stability test for example 1 and comparative example 1 | | |
|---|---|---|---|
| Water phase | water/ oil % (w/w) | Thickness of Oil exudation layer. [%] | Thickness of emulsion layer [%] |
| Pure water (Ex c1) | 9/91 | 61 | 39 |

TABLE 1-continued results stability test for example 1 and comparative example 1

| Water phase | water/ oil % (w/w) | Thickness of Oil exudation layer. [%] | Thickness of emulsion layer [%] |
|---|---|---|---|
| Water + Foam (Ex 1) | 9/91 | 9 | 91 |

Table 1 reveals that the sample containing a water phase which comprising gas bubbles (foam) such that the density of the fatty phase is matched, has an improved stability against oil exudation.

Example 2

The same products as used in example 1; a 9% (w/w) water in 91% oil emulsion with foam (according to the invention) and without foam (reference; comparative example 2) were subjected to a stability test.

In a second stability test, the two samples were filled into centrifuge tubes. Both samples were centrifuged for one hour at 1000 rpm. The resulting layer pattern is also indicative of the product stability. If no separate layers are formed the product is very stable. The formation of a small water layer on the bottom is indicative of reduced but often still acceptable stability. The formation of an oil layer (oil exudation) is undesired and should be as small as possible. The higher the oil layer volume, the more instable the product is.

The reference sample (comparative example c2) developed a water rich bottom layer, a hazy middle layer that still contains some small droplets and a top layer of oil exudation. The hazy middle layer contained less dispersed phase than the original product. This could easily be seen by naked eye. The oil exudation layer accounted for 8.8% of the sample volume.

The sample according to the invention remained an almost homogenous emulsion with a layer of oil exudation that accounted for 3.3% of the sample volume. This again clearly indicated the improved stability of the products according to the invention against phase separation.

Example 3

Two products being 4% (w/w) water in 96% (w/w) oil emulsions were subjected to the stability test as described in example 2, centrifugation for one our at 1000 rpm. The reference product (comparative example c3) contained a plain water phase while the product according to the invention was originating from a purifying step as described in example 1 applied to 10% (w/w) water-foam in 90% oil emulsion. In both cases again the same fat phase and emulsification steps as described above are applied.

The reference product (comparative example c3) developed upon centrifugation a white water-rich bottom layer, a hazy, less water containing, middle layer, and an oil exudation layer. The oil exudation layer accounted for 6.5% of the sample volume.

The product according to the invention developed only a small and almost insignificant oil exudation layer. In this case the layer only accounted for 3% of the sample volume. Further no segregation in different emulsion layers was observed.

This again indicates that products according to the invention are of improved stability against phase separation.

Example 4

Two 20% water in oil emulsions were subjected to a storage trial. The product according to the invention contained a water foam solution as described in example 1 as the water phase. This means no purification step was applied to separate the density matching droplets from the other droplets. Emulsification again was achieved by applying the turbine mixer described above.

The fat phase employed was the same as in the other examples. The reference sample (comparative example c4) again contained a plain water phase. Both samples were after preparation filled in cylindrical glasses and stored in the refrigerator at 5° C. for 5 weeks.

The reference sample (comparative example c4) developed a white bottom layer with an increased concentration of water droplets. On top of this bottom layer a layer of clear oil was found. This oil exudation made up for 30% of the sample volume.

The product according to the invention also developed a bottom layer, since no purification step was applied and not all droplets were density matched. However the bottom layer was of a smaller size than in the comparative example c4. On top of this bottom layer with increased water concentration a middle layer with a concentration of water droplets of about 10% was found. Also this sample suffered from oil exudation. But the thickness of the oil layer on top of the sample was just 3.2% of the sample volume compared to 30% for the comparative example c4.

Again this indicates that products according to the invention perform clearly superior to comparable products in terms of stability against phase separation.

What is claimed is:

1. Pourable water and oil containing emulsion comprising a continuous fatty phase and a dispersed aqueous phase, and gas bubbles, characterised in that said gas bubbles are substantially dispersed in the aqueous phase.

2. Pourable water and oil containing emulsion according to claim 1, comprising 20 to 98 wt % of a fatty phase, and 80 to 2 wt % of an aqueous phase comprising 5 to 20 vol % gas such that the average density of the aqueous phase differs at most 5% from the density of the oil phase.

3. Pourable water and oil containing emulsion according to claim 1, wherein the gas is nitrogen or air or a combination thereof.

4. Pourable water and oil containing emulsion according to claim 1 characterized in that said product has a stability against sedimentation such that after one month storage of the emulsion at 5 degrees C. shows an oil layer of less than 20%.

5. Method for the preparation of a pourable water and oil containing emulsion according to claim 1, characterized in that the method includes a step wherein the water droplets with adequate, approximately oil matching density, are separated form other water droplets.

6. Method according to claim 5, wherein the separation includes a centrifugation step.

7. Method to enhance the stability of a pourable water in oil emulsion whereby gas bubbles are incorporated in the aqueous phase of said pourable water in oil emulsion.

* * * * *